(12) United States Patent
Chatel et al.

(10) Patent No.: US 8,366,433 B2
(45) Date of Patent: Feb. 5, 2013

(54) EXTRUSION DIE AND PROCESS FOR FORMING CEREAL FLAKES

(75) Inventors: Robert Edouard Chatel, Hoffman Estates, IL (US); Gary S. Moore, Johnsburg, IL (US)

(73) Assignee: The Quaker Oats Company, Chicago, IL (US)

(*) Notice: Subject to any disclaimer, the term of this patent is extended or adjusted under 35 U.S.C. 154(b) by 286 days.

(21) Appl. No.: 12/203,303

(22) Filed: Sep. 3, 2008

(65) Prior Publication Data

US 2010/0055282 A1   Mar. 4, 2010

(51) Int. Cl.
B29C 47/14 (2006.01)

(52) U.S. Cl. .......... 425/376.1; 425/382 R; 425/461; 425/464; 426/516

(58) Field of Classification Search .......... 425/207, 425/376.1, 382 R, 461, 464; 426/516
See application file for complete search history.

(56) References Cited

U.S. PATENT DOCUMENTS

| | | | |
|---|---|---|---|
| 1,333,047 A * | 3/1920 | Valentine | 425/192 R |
| 1,946,238 A * | 2/1934 | Ronzoni | 425/311 |
| 1,959,006 A * | 5/1934 | Penza | 426/143 |
| 2,071,434 A | 2/1937 | Uno | |
| 2,120,138 A | 6/1938 | Mathews | |
| 2,339,419 A | 1/1944 | Mckay | |
| 2,514,211 A * | 7/1950 | Carlson | 425/190 |
| 2,613,620 A * | 10/1952 | Allen | 426/502 |
| 3,062,657 A | 11/1962 | Vollink | |
| 3,236,928 A * | 2/1966 | Blume, Jr. | 264/323 |
| 3,462,277 A | 8/1969 | Reinhart | |
| 3,664,779 A | 5/1972 | Warre | |
| 3,808,962 A | 5/1974 | Liepa | |
| 3,852,491 A | 12/1974 | Malzahn | |
| 4,105,728 A * | 8/1978 | Lee | 264/40.7 |
| 4,118,166 A * | 10/1978 | Bartrum | 425/462 |
| 4,182,606 A * | 1/1980 | Gibbon | 425/461 |
| 4,217,322 A * | 8/1980 | Sugano et al. | 264/176.1 |
| 4,435,430 A | 3/1984 | Fulger | |
| 4,497,840 A | 2/1985 | Gould | |
| 4,710,386 A | 12/1987 | Fulger | |
| 4,756,921 A | 7/1988 | Calandro et al. | |

(Continued)

FOREIGN PATENT DOCUMENTS

DE   10355347 A1   9/2004
EP   1133931 A2    9/2001

(Continued)

OTHER PUBLICATIONS

Office Action dated Feb. 17, 2011, issued from corresponding Canadian Patent Application No. 2,675,567.

(Continued)

*Primary Examiner* — Yogendra Gupta
*Assistant Examiner* — Joseph Leyson
(74) *Attorney, Agent, or Firm* — Banner & Witcoff, Ltd.

(57) ABSTRACT

An extrusion die for extruding cooked dough includes at least one slot having an inlet, an outlet and a land. The land has a length and a depth, with the depth extending between the inlet and the outlet and the length extending between a first side and a second side of the land. The depth of the land varies along at least a portion of the length. A process for forming cereal flakes using the extrusion die includes the steps of extruding and cutting.

29 Claims, 12 Drawing Sheets

U.S. PATENT DOCUMENTS

| | | | |
|---|---|---|---|
| 4,790,996 A | | 12/1988 | Roush |
| 4,874,624 A | | 10/1989 | Conroy |
| 4,954,061 A | | 9/1990 | Repholz |
| 4,965,081 A | | 10/1990 | Lazarus |
| 5,129,315 A | | 7/1992 | Burwell |
| 5,132,133 A | | 7/1992 | Huber et al. |
| 5,143,740 A | | 9/1992 | Blanchard |
| 5,167,980 A | * | 12/1992 | Herod et al. ............... 426/496 |
| 5,176,936 A | | 1/1993 | Creighton |
| 5,198,255 A | | 3/1993 | Schwab |
| 5,238,385 A | * | 8/1993 | Johnson .................... 425/183 |
| 5,372,826 A | | 12/1994 | Holtz et al. |
| 5,391,388 A | | 2/1995 | Lewis |
| 5,464,644 A | | 11/1995 | Wullschleger |
| 5,480,669 A | | 1/1996 | Zallie |
| 5,510,130 A | | 4/1996 | Holtz |
| 5,591,472 A | * | 1/1997 | Cummins ................... 426/503 |
| 5,747,091 A | | 5/1998 | Denhartog |
| RE36,067 E | | 1/1999 | Ringe |
| 5,874,120 A | | 2/1999 | Borek |
| 5,888,558 A | | 3/1999 | Janot |
| 5,962,055 A | | 10/1999 | Desjardins |
| 5,997,934 A | | 12/1999 | Geromini |
| 6,054,149 A | | 4/2000 | Hammond |
| 6,129,010 A | | 10/2000 | Hurd |
| 6,136,365 A | | 10/2000 | Burri |
| 6,174,553 B1 | | 1/2001 | Cerda |
| 6,183,788 B1 | | 2/2001 | Leusner |
| 6,210,741 B1 | | 4/2001 | Van Lengerich |
| 6,242,033 B1 | | 6/2001 | Sander |
| 6,287,621 B1 | | 9/2001 | Lacourse |
| 6,291,008 B1 | | 9/2001 | Robie et al. |
| 6,296,468 B1 | | 10/2001 | Deutsch |
| 6,440,473 B2 | | 8/2002 | Geromini |
| 6,451,367 B1 | | 9/2002 | Mcnaught |
| 6,793,953 B2 | | 9/2004 | Zietlow |
| 6,830,768 B2 | | 12/2004 | Neidlinger et al. |
| 7,153,528 B2 | | 12/2006 | Malleshi |
| 7,235,276 B2 | | 6/2007 | Allen et al. |
| 7,318,720 B2 | * | 1/2008 | Pabedinskas ............. 425/378.1 |
| 2001/0051198 A1 | | 12/2001 | Robie et al. |
| 2004/0219280 A1 | | 11/2004 | Green |
| 2006/0141118 A1 | | 6/2006 | Wilson |
| 2006/0246202 A1 | | 11/2006 | Karwowski |
| 2007/0098874 A1 | | 5/2007 | Schlosser |
| 2007/0172559 A1 | | 7/2007 | Capodieci |
| 2007/0264400 A1 | | 11/2007 | Milne |

FOREIGN PATENT DOCUMENTS

| | | |
|---|---|---|
| WO | 95/00026 A1 | 1/1995 |
| WO | 02/087355 A1 | 11/2002 |

OTHER PUBLICATIONS

Extended European Search Report dated Aug. 22, 2011, issued for corresponding European Patent Application No. 09010977.8.

English translation of the first Office Action issued for corresponding Mexican Patent Application No. MX/a/2009/009023. This document was provided by the Applicant's foreign associate, Jan. 18, 2012.

First Office Action issued for corresponding Mexican Patent Application No. MX/a/2009/009023, dated Jan. 18, 2012.

Second Office Action issued for corresponding Mexican Patent Application No. MX/a/2009/009023, dated Jul. 26, 2012.

English translation of the second Office Action issued for corresponding Mexican Patent Application No. MX/a/2009/009023. This document was provided by the Applicant's foreign associate. Office action dated Jul. 26, 2012.

* cited by examiner

EXTRUSION DIE AND PROCESS FOR FORMING CEREAL FLAKES

FIELD OF THE INVENTION

The present invention relates generally to an extrusion die and process for forming cereal flakes. More specifically, the present invention relates to an extrusion die and process for forming curled cereal flakes.

BACKGROUND OF THE INVENTION

Breakfast cereals in ready-to-eat ("RTE") flake form have been produced for years. These cereal flakes typically contain cereal grains such as wheat, rice, oats, corn, etc. and ancillary ingredients such as sugars, salts, oils, etc. Flavoring, coloring and preservative agents and vitamins and mineral fortifiers are also typically included.

Conventionally, RTE cereal flakes have been prepared by toasting wet cereal flakes. The toasting process causes a slight expansion of the flakes and, in some instances, a curling of the flakes. Curled flakes are aesthetically pleasing to the consumer—flat flakes appearing too processed and unnatural. Thus, from a consumer preference standpoint, it is desirable to produce curled flakes and/or also to increase the amount of curling of each individual flake.

Another concern with flat flakes is that they have a relatively high bulk density. Bulk density is a function of the absolute density of the cereal and its packing factor. The packing factor is influenced by the size and shape of the cereal pieces—the lower the packing factor the more air space is present between the cereal pieces. Curled flakes, relative to flat flakes, decrease the packing factor and desirably decrease the bulk density of the cereal product.

One way to form RTE cereal flakes it so introduce the cereal ingredients, in the form of whole grains or grits (large grain pieces), into a batch cooker, cook the mix, dry and temper, and then roll the cooked grain pieces into flakes with flaking rolls After rolling, the flakes are immediately dried to prevent clumping.

It is also known to form RTE cereals flakes by a process which utilizes an extrusion step to form pellets (U.S. Published Patent Application No. 2001/0051198 and U.S. Pat. No. 6,183,788). The cereal ingredients may be batch mixed and fed into an extruder. In the extruder, the ingredients are formed into a cooked dough and then extruded into strands or ropes. These strands are cut into pellets, which are subsequently dried, flaked (for example, with a flaking roller) and toasted according to traditional methods. The post-extrusion processes, including pelletizing, intermediate drying, flaking and toasting, may provide the flakes with a generally curled configuration. However, each of these known post-extrusion processes requires additional equipment and equipment operators, additional floor space and additional energy.

It would be desirable to form RTE cereal flakes having a curl without the use of a flaking roll and/or without the use of an intermediate drying step. A need exists to reduce the number of processing steps, yet still produce a ready-to-eat cereal flake that is aesthetically appealing and that has a pleasing texture.

SUMMARY OF THE INVENTION

The present invention relates to an extrusion die for extruding cooked dough. The extrusion die includes at least one slot having an inlet edge, an outlet edge, and a land. The land has a length and a depth, with the depth extending between the inlet edge and the outlet edge and the length extending between a first side and a second side of the land. The depth of the land varies along at least a portion of the length.

In another aspect, an extruder including an extrusion die having a variable depth land is disclosed.

In yet another aspect of the invention, a process for forming cereal flakes is disclosed. The process includes the steps of extruding a cooked dough through the extrusion die and cutting the extruded dough.

In another aspect, cereal flakes are formed using a process that includes extruding a cooked dough through the extrusion die and cutting the extruded dough.

These and other aspects, along with advantages and features of the present invention herein disclosed, will become apparent through reference to the following description and the accompanying drawings. Furthermore, it is to be understood that the features of the various aspects described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various aspects of the present invention are described with reference to the following drawings, in which.

DETAILED DESCRIPTION OF THE INVENTION

Aspects of the invention are directed to an extrusion die suitable for forming cereal flakes having curled edges, an extruder containing the extruder die, and a process of forming cereal flakes utilizing the extrusion die.

As is well known to those of ordinary skill in the art, a cereal mix for use with an extruder can be prepared by blending various dry cereal ingredients together with water. The water may be added during a pre-conditioning step in the form of liquid water and/or steam. After pre-conditioning (if any), the cereal mix is introduced into an extruder. Within the extruder, the cereal mix is cooked and mechanically worked to form a cooked dough. Upon the application of pressure, the cooked dough is extruded through an extrusion die at the downstream end of the extruder. Rotating knife blades at the extrusion die face cut the dough as it is extruded. In a post-extrusion process, the extruded pieces may be dried. Prior to being dried, the extrudate may be coated. A person of ordinary skill in the art would be familiar with each of these process steps.

The dry cereal ingredients may be any combination of dry cereal components suitable for cooking and extrusion, such as whole and processed flours. Such ingredients include, but are not limited to, flours prepared from oat, corn, wheat, rice, and combinations thereof such as, for example, a combination of a majority of whole oat flour and a minority component of whole wheat flour. Selection of suitable dry cereal components for use with the present invention is within the skill of the art given the benefit of the present disclosure.

In accordance with the present invention, RTE cereal flakes 1 may be formed by extruding a cooked dough through a relatively narrow slot of an extrusion die. Flakes 1 are defined as having relative large length and width dimensions compared to their thickness dimension. As flakes 1 may be curled (or otherwise warped out-of-plane), the length, width, and thickness dimensions referred to above are determined as if the flakes were flat.

Figure 1:
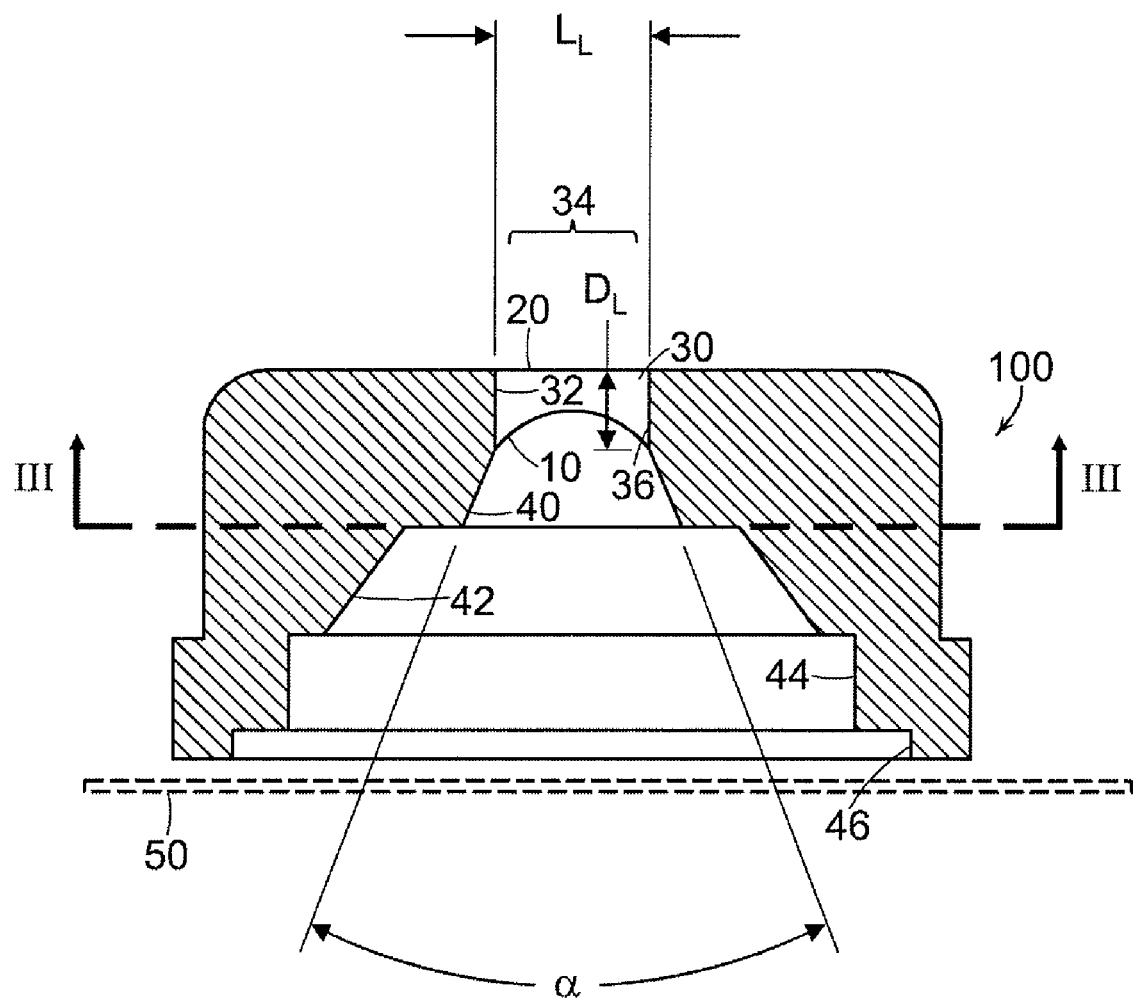
FIG. 1 shows a cross-section view of an extrusion die according to an aspect of the present invention.
Figure 2:
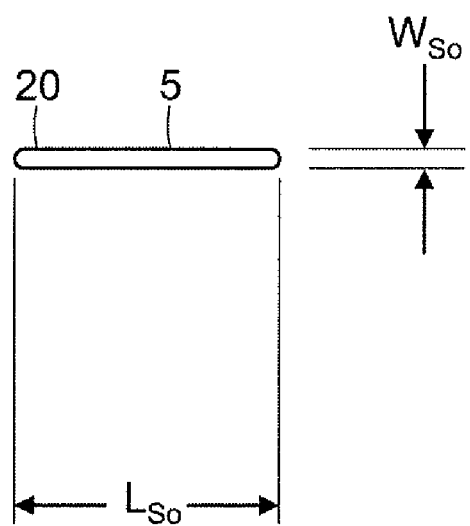
FIG. 2 shows an outlet-side view of the extrusion die slot according to FIG. 1; a FIG. 3 shows an inlet-side view of the extrusion die slot across section III-III as shown in FIG. 1.
Figure 3:
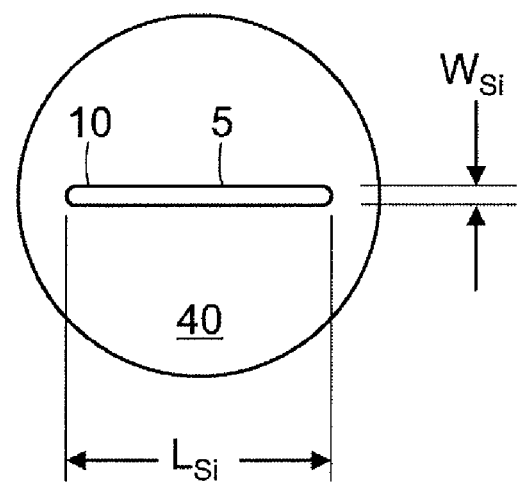

FIGS. 1-3 show an illustrative aspect of an extrusion die for extruding cooked dough. Extrusion die 100 includes a slot 5 having a length ($L_S$) and a width ($W_S$). Slot 5 extends between an inlet 10 and an outlet 20. The length and width dimensions of slot 5 may be different at the inlet side 10 ($L_{Si}$, $W_{Si}$) from the dimensions at the outlet side 20 ($L_{So}$, $W_{So}$). Slot 5 further includes a land 30. Land 30 has a length ($L_L$) and a depth ($D_L$). The depth extends between the inlet 10 and the outlet 20. The length extends between a first side 32 through a middle portion 34 to a second side 36 of land 30. The depth $D_L$ of land 30, i.e. the distance between the inlet edge 10 and the outlet edge 20, varies along at least a portion of the length $L_L$ of the land.

Extrusion die 100 may be formed of any suitable die material(s) as would be known to persons of ordinary skill in the art, including, by way of non-limiting example, stainless steel and brass. Further, any suitable method of manufacturing extrusion die 100 may be used.

Figure 14:
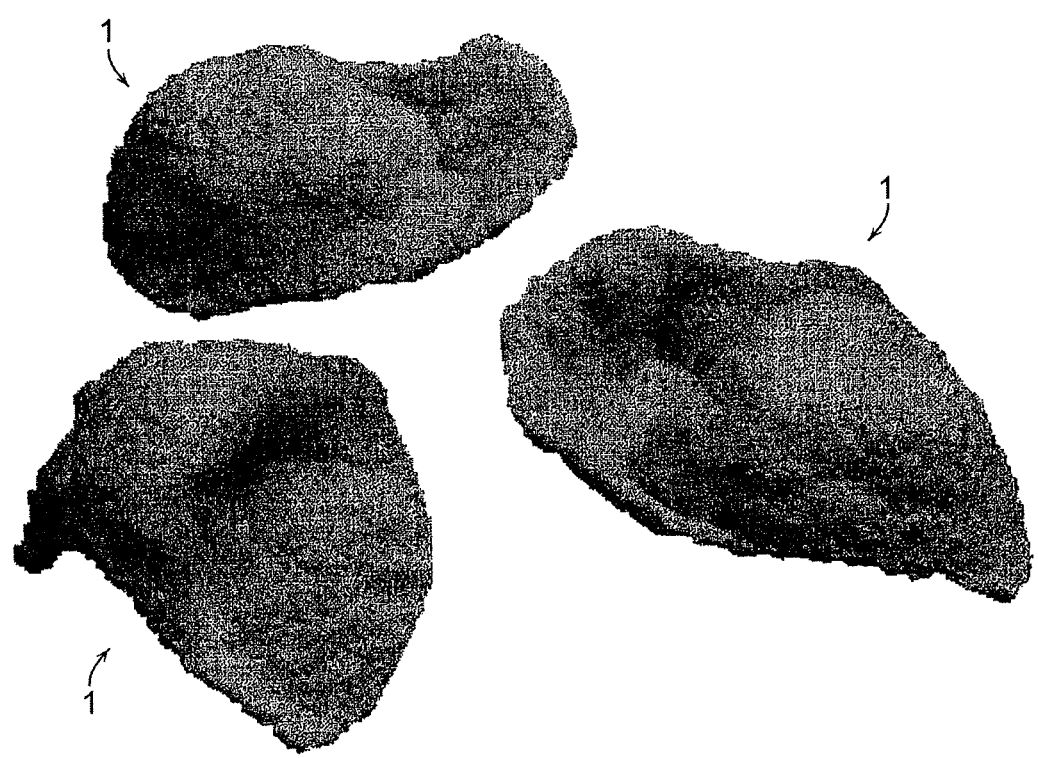
FIG. 14 illustrates cereal flakes produced according to an aspect of the invention.

By way of non-limiting explanation, the varying depth of the land (in conjunction with the slot-like aspects of the die's passageway) causes the dough to travel through the passageway at different speeds. Thus, where the land has a greater depth (for example, at the sides) the dough moves slower than where the land has a lesser depth (for example, in the middle). It has been shown or discovered that this relative speed of passage of the dough through the die causes the dough to cup or curl as it flows through and exits the die. The result is that cereal flakes 1 having a degree of curl are produced by the extrusion process. It has also been discovered, that if the length of the curling piece is allowed to grow (i.e., the cutting rate is slowed), the curl direction unexpectedly reverses and curls in the other direction. Referring to FIG. 14, this results in cereal flakes 1 with a sinusoidal wave-like shape.

In the aspect shown in FIGS. 1-3 and as best shown in FIG. 1, the depth of land 30 is greater at the first side 32 than at a middle portion 34. Indeed, in this aspect, the depth of land 30 is greater at both first side 32 and second side 36 than it is in middle portion 34. Further, the depth of land 30 may vary smoothly along the length of the land from the first side to the second side.

Figure 7:
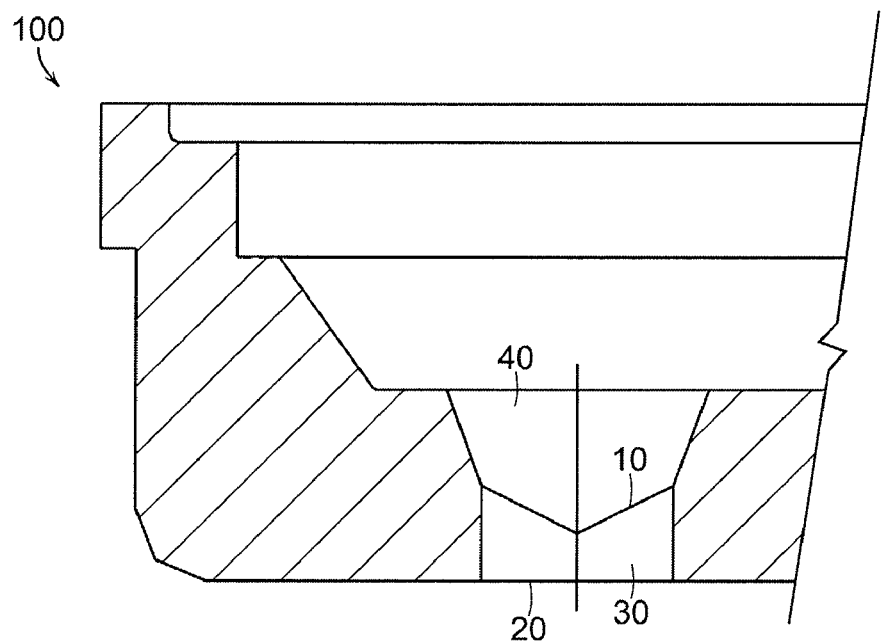
FIG. 7 shows a cross-section view of an extrusion die according to an aspect of the present invention.
Figure 8:
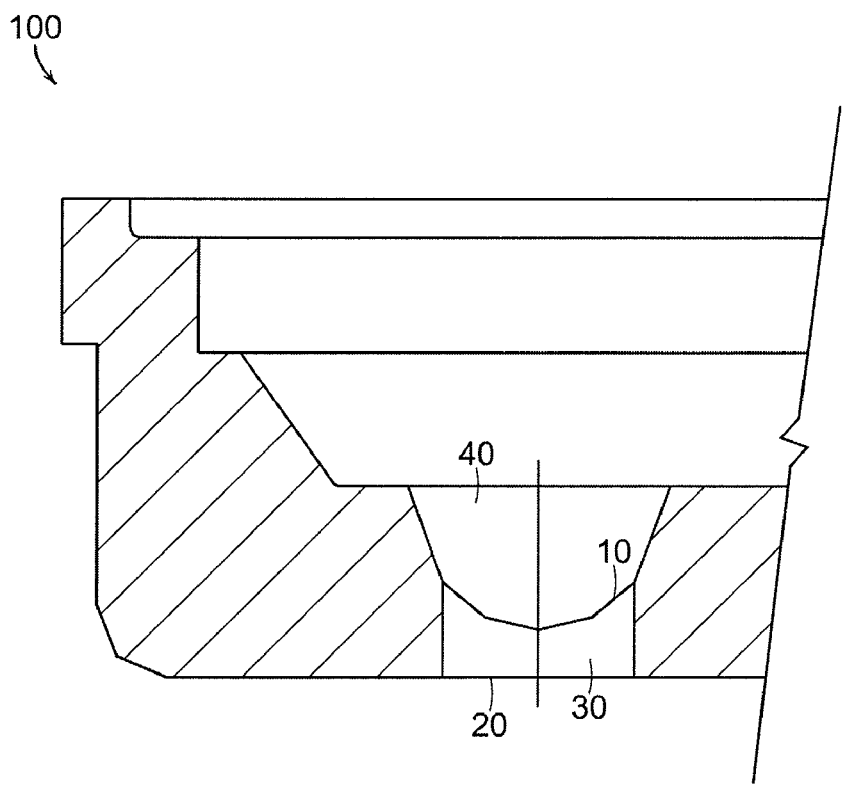
FIG. 8 shows a cross-section view of an extrusion die according to another aspect of the present invention.

The variation in the depth of land 30 may be accomplished by providing a stepped or curved edge at the inlet 10. For example, at least a portion of an inlet edge of the land may be curved (in the plane of land 30). As best shown in FIG. 1, in this particular aspect, the entire inlet edge 10 of land 30 may be curved. Optionally, as best shown in FIGS. 7 and 8, the inlet edge may be composed of stepwise straight portions, by stepwise curved portions or a combination thereof. In FIG. 7, the inlet edge 10 of land 30 is comprised of two linear segments; in FIG. 8, the inlet edge 10 of land 30 is comprised of 4 linear segments. The outlet edge 20 of land 30 may extend in a straight line from the first side to the second side, as shown in the aspect of FIG. 3. Optionally (not shown), outlet edge 20 may also be stepped and/or curved (in the plane of land 30). Further, optionally, both inlet edge 10 and outlet edge 20 may be stepped and/or curved.

By way of specific, non-limiting example and referring back to FIG. 1, the inlet edge of the land may extend along an arc having a radius ranging from approximately 6.5 mm to approximately 10 mm. In one aspect, the arc may have a radius of approximately 8 mm. Further, the depth of the land at a first side may range from approximately 5 mm to approximately 7.5 mm long. In one aspect, the depth of the land at the first side (and optionally the second side) may be approximately 6.3-6.4 mm long. Even further, the depth of the land at the middle portion may range from approximately 2.5 mm to approximately 4 mm. In one aspect, the depth of the land in the middle portion may be approximately 3.2 mm long.

As best shown in FIGS. 2 and 3, inlet edges 10 and outlet edges 20 of slot 5 have width dimensions ($W_{Si}$ and $W_{So}$, respectively) and length dimensions ($L_{Si}$ and $L_{So}$, respectively). The width and length dimensions of slot 5 at the inlet and the outlet may be the same or different. In one aspect, the inlet and/or the outlet of slot 5 may have a length dimension ranging from approximately 10 mm to approximately 15 mm. As a specific, non-limiting example, the outlet may have a length dimension of approximately 13 mm. In another aspect, the inlet and/or the outlet may have a width dimension ranging from approximately 0.4 mm to approximately 1.0 mm. As a specific, non-limiting example, the inlet and/or outlet may have a width dimension ranging from approximately 0.51 mm to approximately 0.74 mm. Further, the ratio of the length dimension-to-width dimension of slot 5 at the inlet and/or the outlet may range from approximately 10 to approximately 40. As a specific, non-limiting example, this ratio may be approximately 17. As shown in FIGS. 2 and 3, the ends of the inlet and/or outlet slots may be radiused. In the aspect of FIGS. 2 and 3, the ends are provided with a full semicircular curve.

The extrusion die may include multiple bores 40, 42, 44, 46 upstream of inlet 20. Bores 44 and 46 may be configured to accommodate the method of attaching the extrusion die to the extruder, and as such, may accommodate o-rings and/or distribution plates. As best shown in FIG. 1, bores 44 and 46 may be cylindrical, i.e., having a constant diameter, while bores 40 and 42 may be frusto-conical. The included angle ($\alpha$) of frusto-conical bore 40 may be any suitable angle such as approximately 20 to approximately 60 degrees. In one non-limiting example, the angle may be approximately 40 degrees. The desired angle may depend on, for example, properties of the cooked dough. As would be appreciated by a person of ordinary skill in the art, given the benefit of the present disclosure, there could be any number of bores and the cross-sectional shape of the bores need not be circular.

As best shown by FIGS. 1 and 3 in concert, the downstream end of frusto-conical bore 40 may be used to shape inlet 10 of the extrusion die. In the aspect shown, bore 40 is provided with a hemispherical end.

Figure 4B:
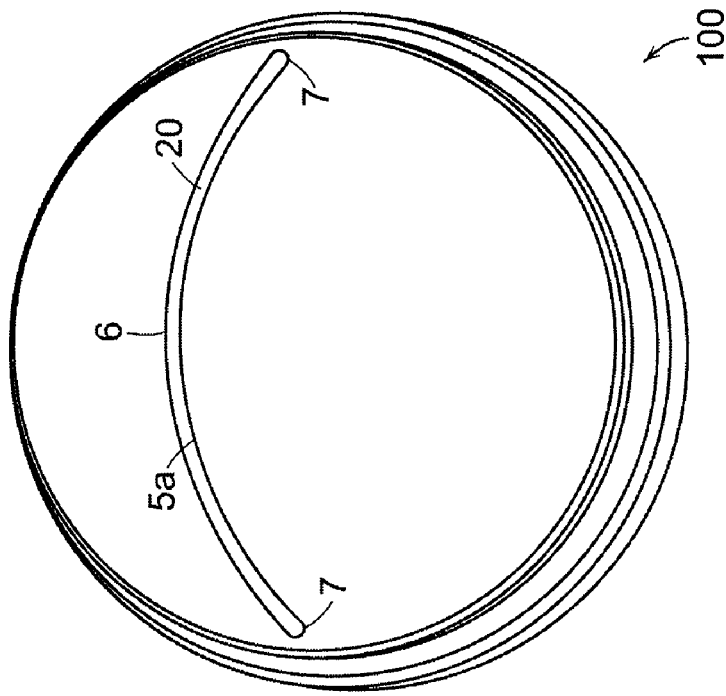
FIG. 4B shows an outlet-side view of the extrusion die according to FIG. 4A.
Figure 4A:
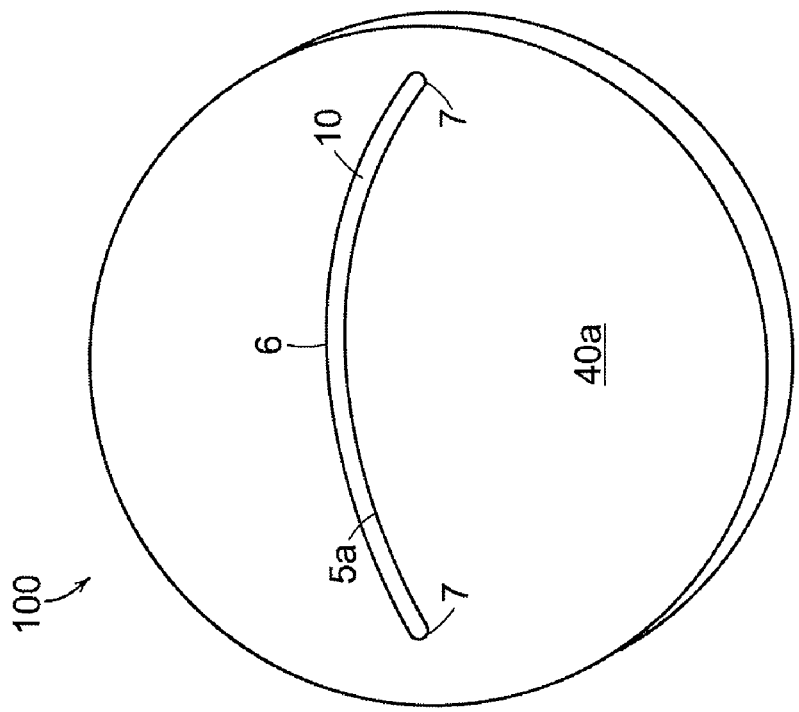
FIG. 4A shows an inlet-side view of an extrusion die according to another aspect of the invention.
Figure 5B:
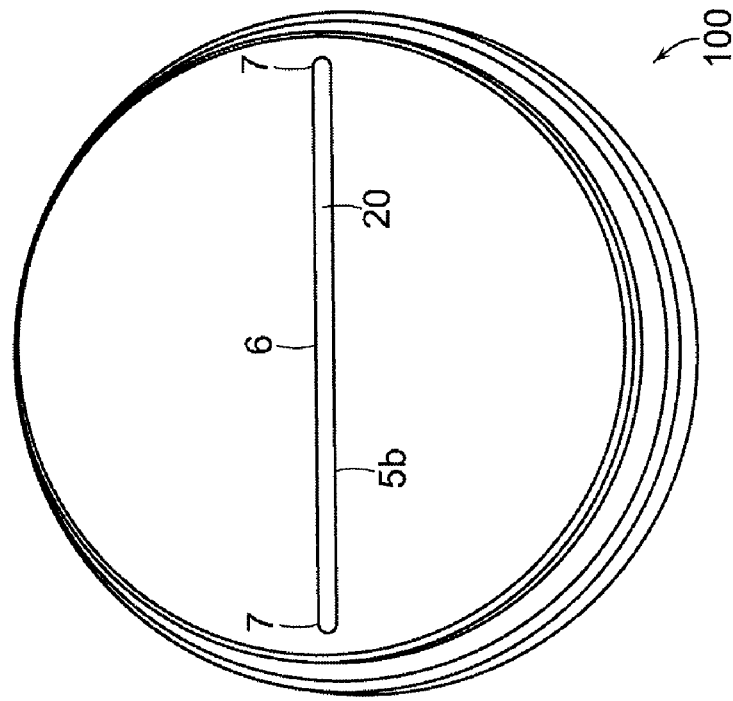
FIG. 5B shows an outlet-side view of the extrusion die according to FIG. 5A.
Figure 5A:
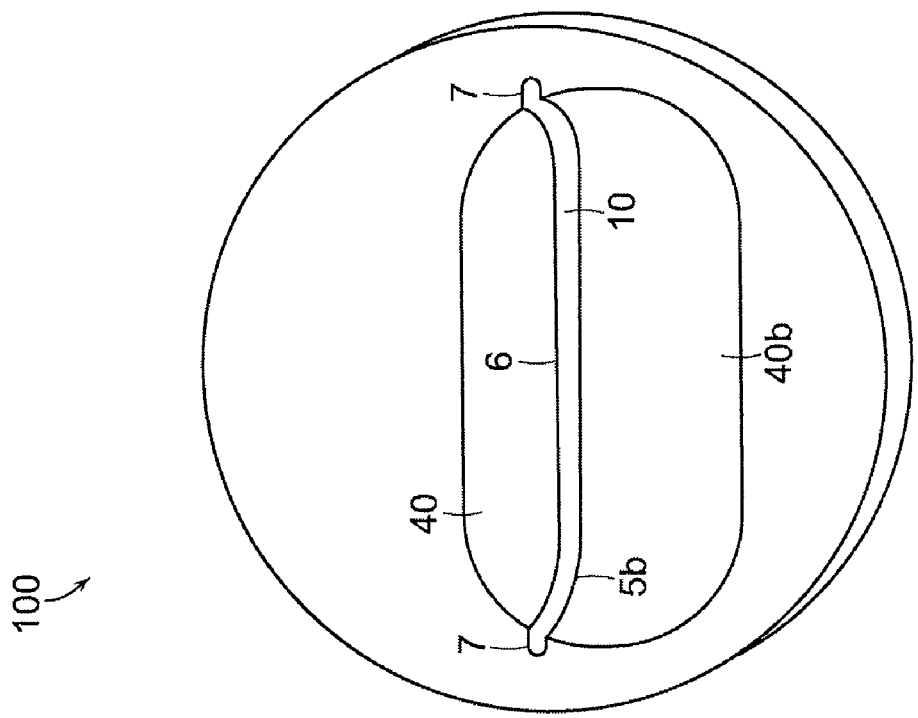
FIG. 5A shows an inlet-side view of an extrusion die according to another aspect of the invention.

In another aspect of the present invention, FIGS. 4A and 4B show an extrusion die having a non-linear slot 5a. In this aspect, slot 5a is curved and is no longer centered within bore 40a of extrusion die 100. Curved slot 5a defines a midpoint 6 and endpoints 7. Bore 40a is hemispherical. Because the thickness of the die (in the flow direction) is a minimum at the center of the hemispherical bore, the curved slot 5a has a land depth at its midpoint 6 that is greater than the midpoint land depth of a slot that extends through the center of bore 40a. Thus, by varying the amount of curvature of slot 5a, the midpoint-to-endpoint land depth ratio of the slot can be varied. Further, the curved slot may allow the overall dimensions of the extrusion die to be minimized, as the curved slot can be provided with the same length as a straight slot within a smaller diameter. Other non-linear shaped slots, such as a V-shaped slot or S-shaped slot, may be provided According to another aspect of the invention, FIGS. 5A and 5B show an extrusion die having a straight slot 5b with an elongated bore 40b. Bore 40b may be formed by a hemispherical ball cutter traversing along the length of slot 5b. Elongated bore 40b may be centered on slot 5b or off-center, as shown in FIG. 5A. Elongated bore 40b provides a land having a constant depth in the center portion of slot 5b and a varying depth (formed by the radius of the ball cutter) at the end portions of the slot.

Figure 6B:
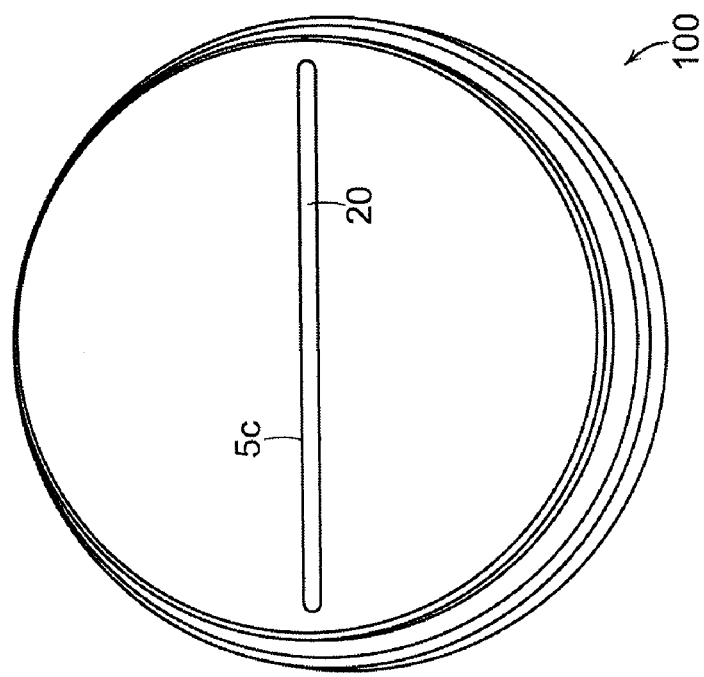
FIG. 6B shows an outlet-side view of the extrusion die according to FIG. 6A.
Figure 6A:
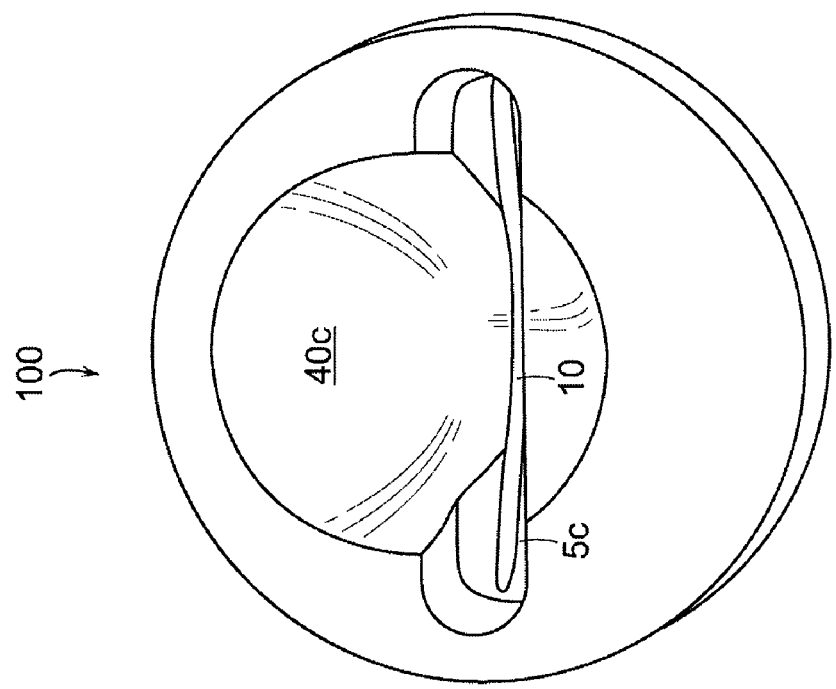
FIG. 6A shows an inlet-side view of an extrusion die according to another aspect of the invention.

FIGS. 6A and 6B show an extrusion die according to another aspect of the invention. Bore 40c is formed by combining an elongated bore portion (centered over slot 5c) with an off-centered spherical bore portion. The spherical bore portion is deeper than the elongate bore portion. A person of ordinary skill in the art would recognize, given the benefit of this disclosure, that any of a variety of bores could be provided such that the depth of the land varies along at least a portion of the length.

Figure 9A:
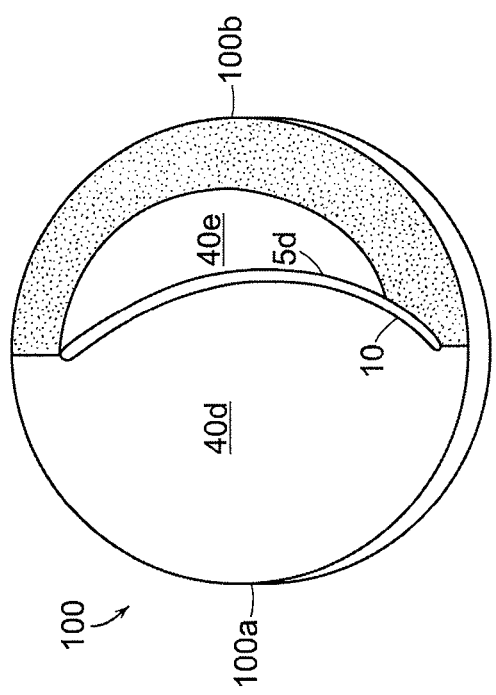
FIG. 9A shows an inlet-side view of an extrusion die according to another aspect of the invention.
Figure 9C:
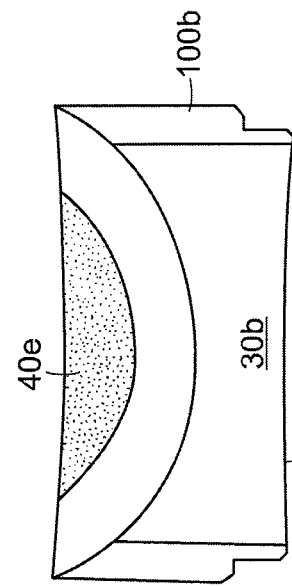
FIG. 9C shows a slot-side view of a second extrusion die element according to FIG. 9A.
Figure 9B:
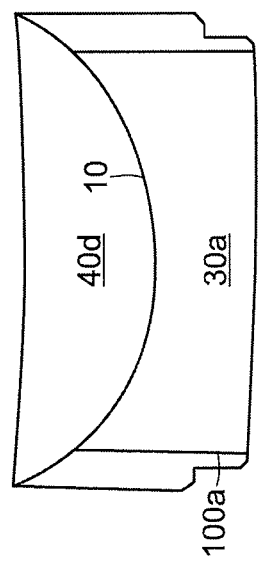
FIG. 9B shows a slot-side view of a first extrusion die element according to FIG. 9A.

FIGS. 9A, 9B and 9C show an extrusion die 100 formed in two parts. FIG. 9A shows the two parts 100a, 100b joined to form the extrusion die. FIG. 9B shows a first extrusion die part 100a; FIG. 9C shows a second extrusion die part 100b. Each part includes a portion of bore 40d, 40e and a portion of land 30a, 30b. Slot 5d is formed when parts 100a and 100b are joined together. Parts 100a, 100b may be joined together in any suitable manner, including, welding, brazing, adhesive, mechanical fasteners, and/or clamping. Extrusion die part 100a has a first surface finish and extrusion die part 100b has a second surface finish that is different from the first surface finish. In the example shown in FIGS. 9A-9C, part 100a has a rough surface finish relative to the smooth surface finish of part 100b. The rougher surface finish of part 100a has a higher coefficient of friction than the smooth surface finish of part 100b. The difference in surface finishes promotes a higher flow rate on the smoother side (than that experienced by the rougher side), thus imparting a greater curling torque to the extruded dough. The surface finishes may be provided on the surface of the bore, the surface of the land, or on both. The extrusion die may be formed in two parts (as shown in FIGS. 9B and 9C) to facilitate the manufacture of the die with two different surface finishes.

Figure 10B:
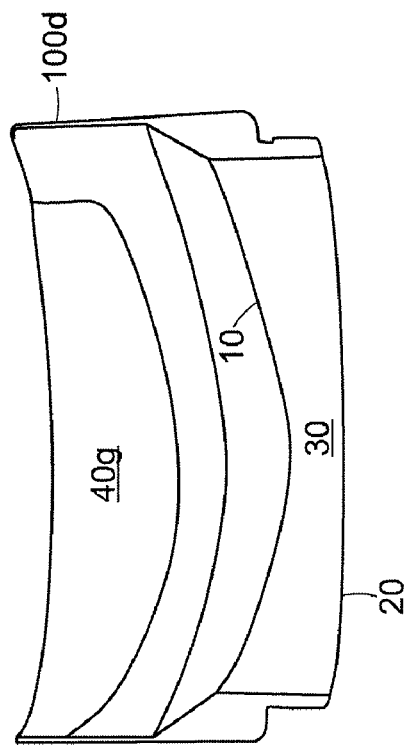
FIG. 10B shows a slot-side view of a second extrusion die element according to FIG. 10A.
Figure 10A:
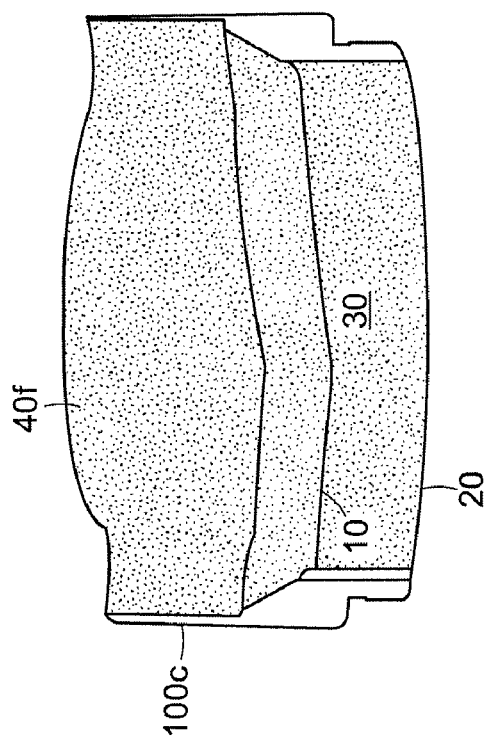
FIG. 10A shows a slot-side view of a first extrusion die element according to another aspect of the invention.

FIGS. 10A and 10B illustrate two parts of an extrusion die 100 as a variation of the extrusion die of FIGS. 9A-9C. FIG. 10A shows a first extrusion die part 100c having a relatively rough surface finish. FIG. 10B shows a second extrusion die part 100d having a relatively smooth surface finish. Each die part 100c, 100d has a variable land length created by forming substantially V-shaped bore portions 40f, 40g on the inlet side of the die. Parts 100c, 100d may be joined together in any suitable manner to form slot 5 and extrusion die 100.

Figure 11A:
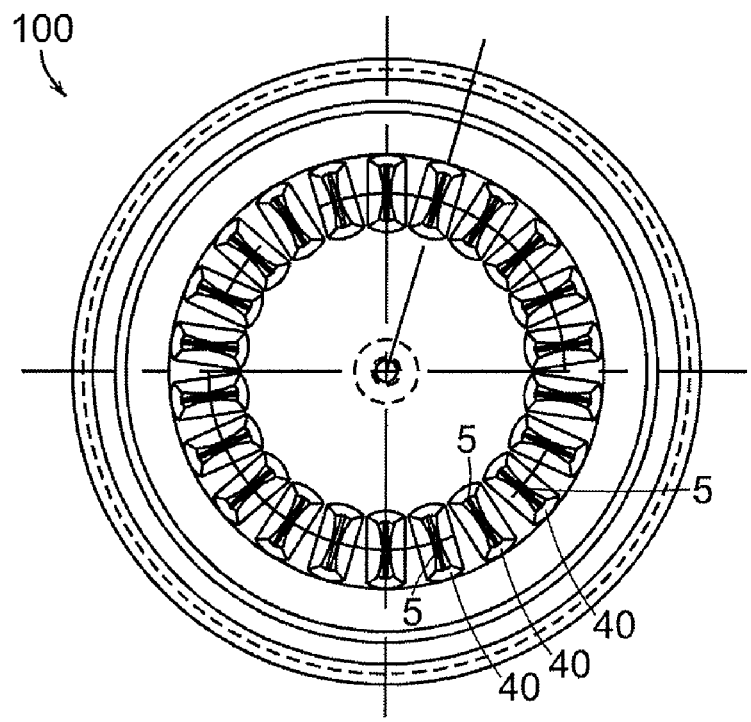
FIG. 11A shows an inlet-side view of a multiple bore extrusion die according to an aspect of the invention.
Figure 11B:
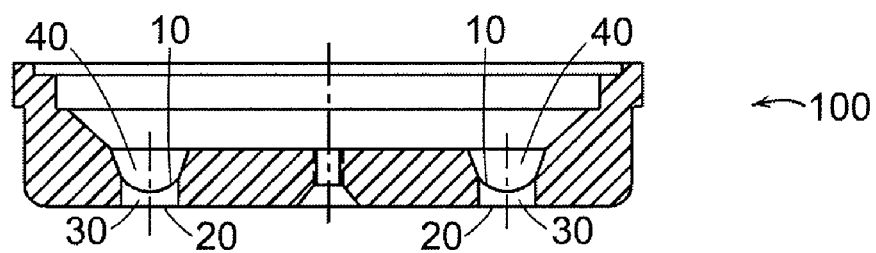
FIG. 11B shows a cross-section view of an extrusion die according to FIG. 11A.

According to another aspect, as shown in FIGS. 11A and 11B, extrusion die 100 could include multiple bores 40 and multiple slots 5. In the example of FIG. 11A, 22 bores are equally spaced on approximately a 3 inch diameter. In general, bores 40 and slots 5 may be arranged in any suitable manner.

Figure 12C:
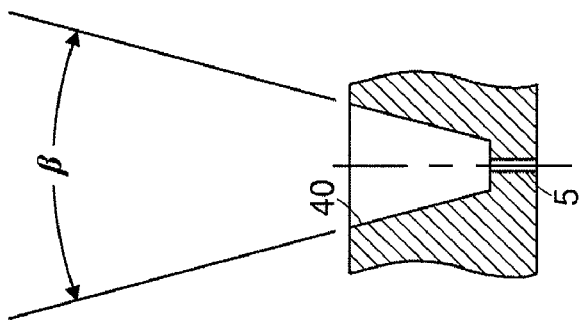
FIG. 12C shows a cross-section view of the single bore taken at section XII.C-XII.C of FIG. 12B.
Figure 12A:
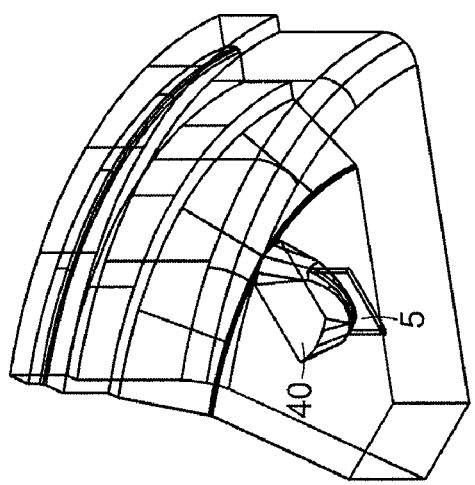
FIG. 12A shows a perspective view of a single bore of the multiple bore extrusion die according to FIG. 11A.
Figure 12B:
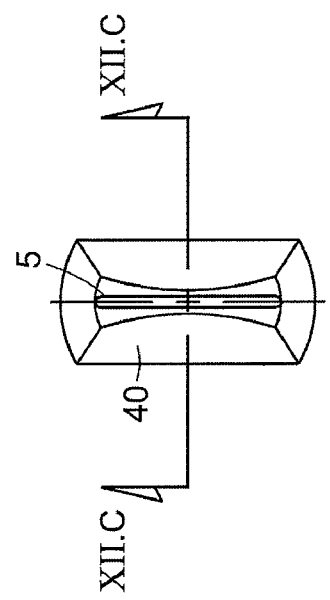
FIG. 12B shows an inlet-side view of the single bore according to FIG. 12A.

FIGS. 12A, 12B and 12C show details of a single bore as may be used in an extrusion die having multiple bores. Some non-limiting examples of dimensions associated with a typical bore 40 and a typical slot 5 are presented herein. Slot 5 may have a length of approximately 0.5 inches and a width of approximately 0.03 inches. The length dimension of slot 5 may be aligned in a radial direction of the extrusion die. The minimum land depth (i.e., the land depth at the midpoint) of slot 5 may be approximately 0.12 inches and the maximum land depth (i.e., the land depth at the sides) of slot 5 may be approximately 0.25 inches. Inlet edge 10 of slot 5 may be radiused in the length direction (refer to FIG. 11B), thus forming a smoothly varying length land. In the width direction, inlet edge 10 of slot 5 may be straight across (refer to FIG. 12C). The length of bore 40 at its upper opening may be approximately 0.68 inches; the width of bore 40 at its upper opening may be approximately 0.33 inches, the depth of bore 40 at the midpoint of slot 5 may be approximately 0.38 inches. The included angle, $\beta$, of the widthwise sides of bore 40 may be approximately 30 degrees; the included angle of the lengthwise sides of bore 40 may be approximately 40 degrees. The extrusion die may be formed of a stainless steel or any other suitable material.

Figure 13:
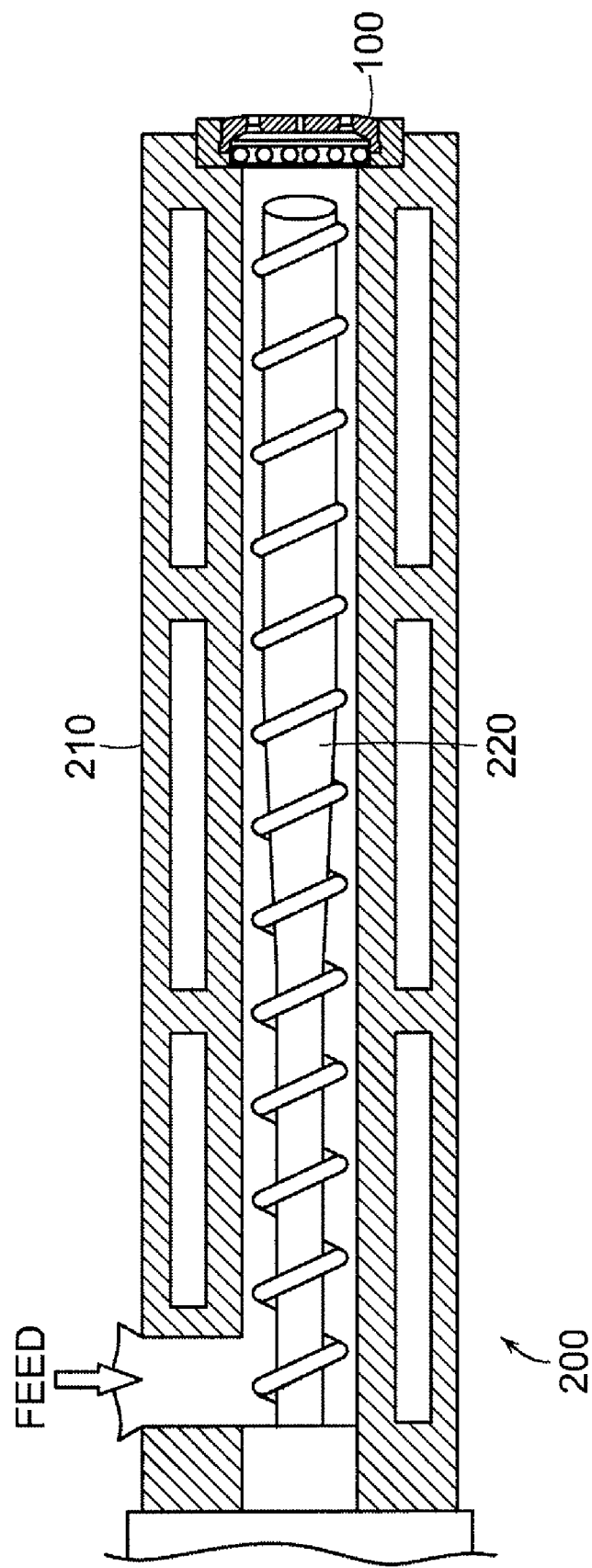
FIG. 13 shows an extruder according to an aspect of the invention.

FIG. 13 schematically illustrates an extruder 200 that may be used for extruding dough through extrusion die 100. Extruder 200 includes a barrel 210 and a screw 220 positioned within the barrel. Extrusion die 100 is located at a downstream end of barrel 210. The extruder may be any suitable extruder that can accommodate an extrusion die such as a twin screw extruder. By way of non-limiting example, a conventional twin screw extruder having a length-to-diameter ratio of 16 to 24 and having a maximum screw speed of 500 RPM may be used to facilitate the process described herein. A blade (not shown) for cutting the extruded dough as it exits the extruder may be located adjacent the outlet of the extrusion die.

In one aspect of the present invention, a process for forming cereal flakes 1 is described herein. The process includes extruding a cooked dough through the extrusion die described above and cutting the extruded dough adjacent the outlet face of the extrusion die to form flakes. The geometry of the extrusion die encourages cupping or curling of the cooked dough as the dough is extruded. Thus, flakes 1 formed from this process will have the appearance of rolled flakes, without actually undergoing any flaking roll and/or intermediate drying processes.

The process may further include drying the flakes. In one aspect, the flakes are dried by toasting. Toasting is performed at temperatures high enough to generate browning of the flakes. In some instances, toasting is performed at temperatures high enough to nearly burn the flakes. Alternatively, the flakes could be dried without toasting. Even further, if desired, the process may include coating the flakes after the step of cutting, but before the step of drying.

In some aspects, the cooked dough may undesirably include particulate matter that is too large to pass through the extrusion die's slot. In such case, the process may further include placing a screen 50 upstream of the extrusion die to filter out these particles that could block the extrusion die.

In even another aspect, cereal flakes 1 formed by the process described above are described herein. The cereal flakes may have a bulk density ranging from approximately 50 grams/liter to approximately 220 grams/liter. As a specific, non-limiting example, the cereal flakes 1 may have a bulk density ranging from approximately 100 grams/liter to approximately 170 grams/liter. In another example, the cereal flakes 1 may have a bulk density ranging from approximately 140 grams/liter to approximately 160 grams/liter. Further, the cereal flakes 1 may have an average thickness ranging from approximately 0.4 mm to approximately 2.2 mm. As a specific, non-limiting example, the cereal flakes 1 may have an average thickness ranging from approximately 0.8 mm to approximately 2 mm. Even further, the cereal flakes 1 may have an average width ranging from approximately 4 mm to approximately 15 mm. As a specific, non-limiting example, the cereal flakes 1 may have an average width ranging from approximately 6 mm to approximately 12 mm. The length of the cereal flakes is typically determined by the flow rate of the extrudate and the cutting rate of the rotating knife blades at the extrusion die face. As a specific, non-limiting example, the cereal flakes may have an average length-to-average width ratio ranging from approximately 1.0 to approximately 2.0.

As would be appreciated by persons of ordinary skill in the art, given the benefit of this disclosure, the slot height, the slot land length, the dough's viscosity, and the flow rate of the dough through the slot of the extrusion die influence the ultimate thickness and texture of the flakes. Further, the composition, temperature and moisture content of the dough also can be manipulated to influence the amount of expansion of the dough upon exiting the extrusion die and thus, to also influence the ultimate characteristics of the flakes.

Extruded doughs may be subject to a phenomenon called die swell. Fully gelatinized starch doughs are typically viscoelastic, which means they resist deformation (viscous) and are elastic at the same time. Elastic doughs have memory, which means they will try to bounce back to the shape they had before being forced through a die. Typically, swell increases with viscosity; decreases with increased land; and increases with the shear rate in the slot. Generally, shear increases as the flow rate through the slot increases and as the slot gets narrower. This means that a relatively low flow rate through the slot may be used to form a relatively thin flake, while a higher flow rate may result in a relatively thick flake. By way of non-limiting example, a flow rate in the range of approximately 15 to 40 kilogram of dry ingredients/hour/slot may provide a typical operating range. A preferred rate may be approximately 14 to 22 kilogram of dry ingredients/hour/slot for a twelve-slot die. To get uniform flow through a sixteen-slot die at production scale, a rate of approximately 24 to 36 kilogram of dry ingredients/hour/slot was used.

As described, the present invention provides an extrusion die which efficiently produces aesthetically pleasing, curled, RTE cereal flakes 1 without the need for extensive post-extrusion processing, thereby streamlining the flake forming process and saving time, energy, and capital. In one aspect, the individual flakes 1 curl in a single direction. In another aspect, referring to FIG. 14, when the cut rate is slowed, thereby allowing longer flakes to be formed, the individual flakes 1 curl out-of-the plane in a first direction and out-of-the-plane in a second direction substantially opposite to the first direction. These doubly-curled flakes 1 assume a substantially sinusoidal wave-like shape.

The invention may be embodied in other specific forms without departing from the spirit or essential characteristics thereof. The foregoing aspects, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. An extrusion die for extruding cooked dough, the die comprising:
   at least one slot, the slot including:
      an inlet edge;
      an outlet edge; and
      a land having a length and a depth, the depth extending between the inlet edge and the outlet edge and the length extending between a first side and a second side of the land,
      wherein the depth of the land varies along at least a portion of the length,
      wherein a first portion of an inner surface of the slot has a first surface finish that is rougher than a second surface finish on a second portion of the inner surface of the slot, and
      wherein the first portion of the inner surface of the slot is opposed to the second portion of the inner surface of the slot.

2. The extrusion die of claim 1, wherein the slot at the outlet edge has a width dimension ranging from approximately 0.4 mm to approximately 1.0 mm.

3. The extrusion die of claim 1, wherein the depth of the land is greater at the first side than at a middle portion of the land.

4. The extrusion die of claim 1, wherein the depth of the land is greater at both the first side and the second side than at a middle portion of the land.

5. The extrusion die of claim 1, wherein the depth of the land varies smoothly along the length from the first side to the second side.

6. The extrusion die of claim 1, wherein the outlet edge of the slot extends in a straight line from the first side to the second side of the land.

7. The extrusion die of claim 1, wherein at least a portion of the inlet edge of the slot is curved in the plane of the land.

8. The extrusion die of claim 1, further comprising a converging bore immediately upstream of the inlet edge.

9. The extrusion die of claim 1, wherein the outlet of the slot has an elongated cross-section extending between first and second ends and wherein an elongated length of the slot is greater than a linear distance between the first and second ends.

10. The extrusion die of claim 1, wherein the at least one slot is a plurality of slots.

11. An extruder for extruding dough to form curled flakes, the extruder comprising:
a barrel;
at least one screw positioned within the barrel; and
an extrusion die at a downstream end of the barrel, the extrusion die having at least one slot for extruding therefrom curled flakes, the slot having an inlet edge, an outlet edge, and a land having a length and a depth, the depth extending between the inlet edge and the outlet edge and the length extending between a first side and a second side of the land, wherein the depth of the land varies along at least a portion of the length,
wherein a first portion of an inner surface of the slot has a first surface finish that is rougher than a second surface finish on a second portion of the inner surface of the slot, and
wherein the first portion of the inner surface of the slot is opposed to the second portion of the inner surface of the slot.

12. An extrusion die for extruding cooked dough, the die comprising:
a bore defining an extrudate flow direction, the bore having at least one converging side and a downstream end having a surface oriented transverse to the extrudate flow direction and oriented transverse to a surface of the converging side; and
at least one slot including:
an inlet completely formed in the surface of the downstream end of the bore;
an outlet; and
a land having a length and a depth, the depth extending between the inlet and the outlet and the length extending between a first side and a second side of the land, wherein the depth of the land, from the first side to the second side, varies smoothly along the length of the land.

13. The extrusion die of claim 12, wherein the inlet edge of the land extends along an arc in the plane of the land having a radius ranging from approximately 6.5 mm to approximately 10 mm.

14. The extrusion die of claim 12, wherein at least one of the outlet edge and the inlet edge has a length dimension and a width dimension, wherein the ratio of the length dimension-to-width dimension ranges from approximately 10 to approximately 40.

15. The extrusion die of claim 12,
wherein the depth of the land at a first side ranges from approximately 5 mm to approximately 7.5 mm,
wherein the depth of the land at a middle portion ranges from approximately 2.5 mm to approximately 4 mm, and
wherein the slot at the outlet edge has a length dimension ranging from approximately 10 mm to approximately 15 mm.

16. The extrusion die of claim 12, wherein, viewed along the length of the slot, the cross-section of the surface of the downstream end is generally perpendicular to the extrudate flow direction.

17. The extrusion die of claim 12, wherein at least a portion of the surface of the downstream end is radiused.

18. The extrusion die of claim 12, wherein the outlet of the slot has an elongated cross-section extending between first and second ends and wherein an elongated length of the slot is greater than a linear distance between the first and second ends.

19. The extrusion die of claim 12, wherein the depth of the land is greater at the first side than at a middle portion of the land.

20. The extrusion die of claim 12, wherein at least a portion of the inlet of the slot is curved in the plane of the land.

21. The extrusion die of claim 12, wherein the slot is off-center from a center of the bore.

22. The extrusion die of claim 12, wherein the slot at the outlet has a width dimension ranging from approximately 0.4 mm to approximately 1.0 mm.

23. The extrusion die of claim 12, wherein a first portion of an inner surface of at least one of the slot and the bore has a first surface finish that is rougher than a second surface finish on a second portion of the inner surface of the at least one of the slot and the bore, and wherein the first portion is opposed to the second portion.

24. The extrusion die of claim 12, wherein the depth of the land, from the first side to the second side, varies arcuately along the length of the land.

25. The extrusion die of claim 12, wherein the bore defines a converging, included angle of approximately 20 degrees to approximately 60 degrees.

26. The extrusion die of claim 12, wherein the bore is frusto-conical.

27. The extrusion die of claim 12, wherein the depth of the land, from the first side to the second side, varies continuously along the entire length of the land.

28. The extrusion die of claim 12, wherein the length of the slot is aligned with the converging side.

29. The extrusion die of claim 12, wherein the bore converges upstream of the inlet to the slot.

* * * * *